W. M. SHOLLEY.
LEVER BRAKE FOR CARS.
APPLICATION FILED NOV. 26, 1915.

1,195,109.

Patented Aug. 15, 1916.
2 SHEETS—SHEET 1.

Witnesses
G. F. Jurecek
Adele Sherman

Inventor
William M. Sholley
By Orwig & Bair
Attys.

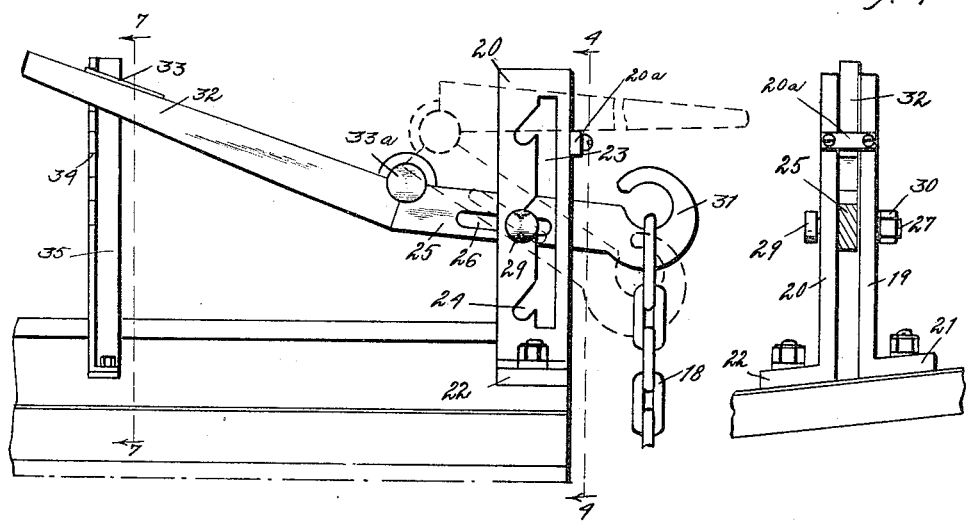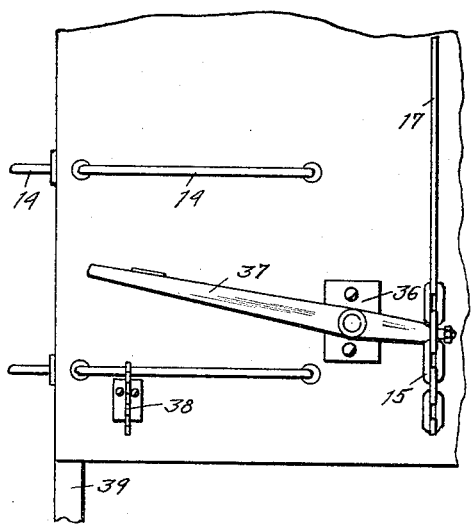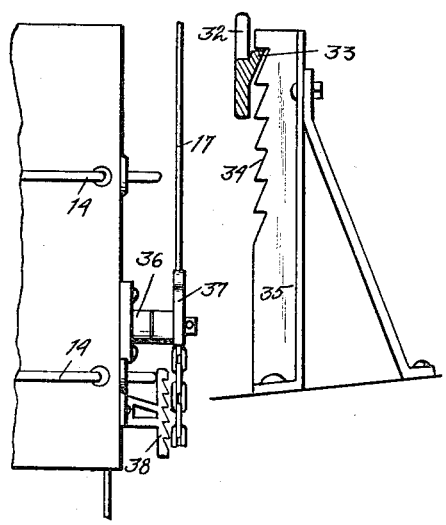

UNITED STATES PATENT OFFICE.

WILLIAM M. SHOLLEY, OF DES MOINES, IOWA, ASSIGNOR OF FORTY-NINE ONE-HUNDREDTHS TO DAVID C. LA VINE, OF DES MOINES, IOWA.

LEVER-BRAKE FOR CARS.

1,195,109.  Specification of Letters Patent.  Patented Aug. 15, 1916.

Application filed November 26, 1915.  Serial No. 63,504.

*To all whom it may concern:*

Be it known that I, WILLIAM M. SHOLLEY, a citizen of the United States, and resident of Des Moines, in the county of Polk and State of Iowa, have invented certain new and useful Improvements in Lever-Brakes for Cars, of which the following is a specification.

The object of my invention is to provide a lever brake especially adapted for freight or passenger cars of simple, durable and inexpensive construction.

A further object is to provide simple and inexpensive mechanism whereby the brakes on cars may be manually operated by a suitable lever so arranged that brakes may be tightly set with a minimum of effort.

A further object is to provide such a device so constructed that the brakes may be operated either from the top of the car or from the stirrup at either end of the cars.

Still a further object is to provide such a brake mechanism, having parts so constructed and arranged that they may be readily and easily adjusted for fitting the mechanism to cars of different kinds, heights and sizes.

A further object is to provide such a brake mechanism in which the parts will not be in the way when the brakes are not set.

A further object is to provide such a brake controlling mechanism as to be plainly visible at all times whether brakes are set or are not set without testing brakes on each car.

Figure 1:
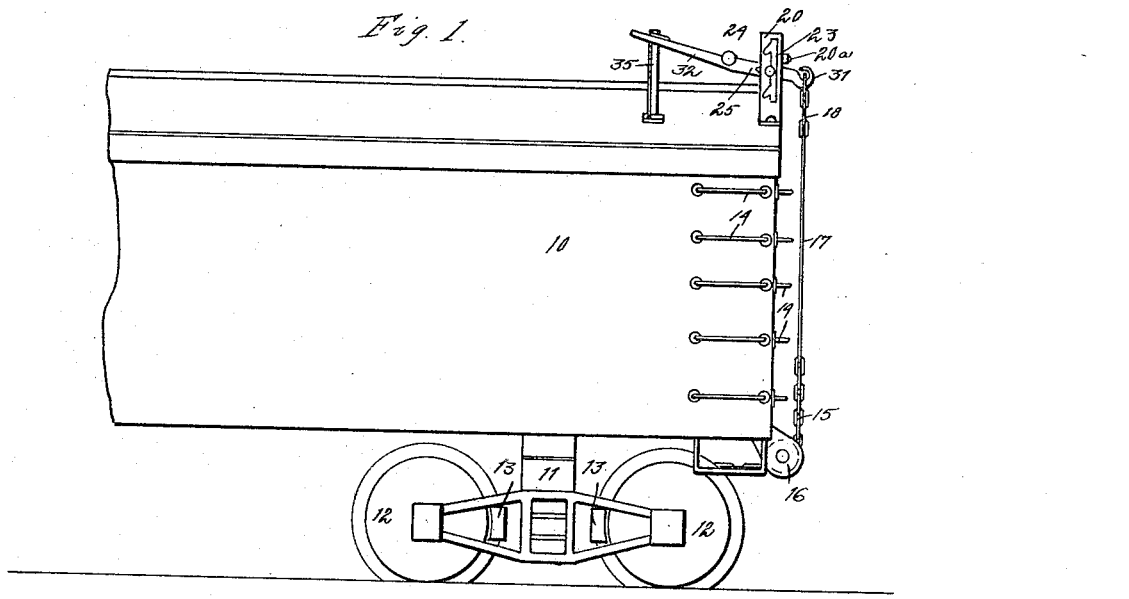
Figure 2:
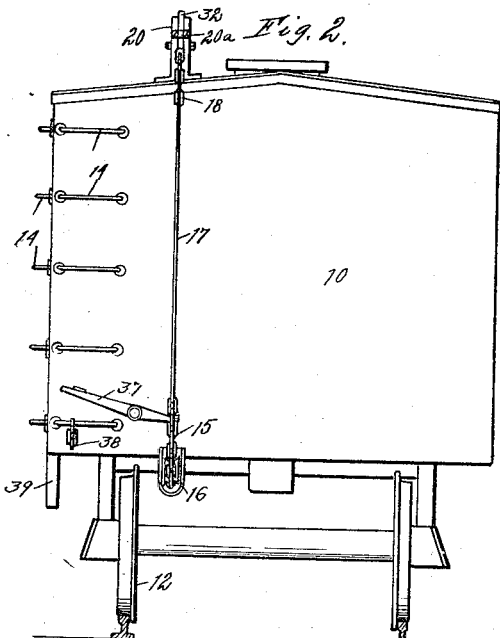

My invention consists in the construction, arrangement, and combination of the various parts of the device, whereby the objects contemplated are attained as hereinafter more fully set forth, pointed out in my claims and illustrated in the accompanying drawings, in which:

Figure 1 shows a side elevation of a part of a car equipped with a lever brake controlling mechanism embodying my invention. Fig. 2 shows an end elevation of the same. Fig. 3 shows an enlarged view in side elevation of the controlling mechanism on top of the car. Fig. 4 shows a vertical, sectional view, taken on the line 4—4 of Fig. 3. Fig. 5 shows an end elevation of a portion of a car showing the lever for controlling the brake from the stirrup. Fig. 6 shows a side elevation enlarged of the end of a car with the brake thereon, and Fig. 7 shows a vertical sectional view taken on the line 7—7 of Fig. 3.

In the accompanying drawings, I have used the reference numeral 10 to indicate generally a box car having the ordinary trucks 11 on which are the wheels 12, having the brakes 13. I have not shown the details of the brakes, insomuch as they form no part of my present invention, my invention being confined to the brake controlling mechanism. On the side and end of the car are the ordinary grab irons 14.

It is well known that in ordinary constructions there is connected with the brakes of cars, a chain 15 extending from the brake mechanism to the end of the car, and in the ordinary construction the chain is wound around an upright shaft. My improved mechanism includes a guide pulley 16 at the lower part of the end of the car, properly located to permit the chain 15 to be extended over said pulley. The upper end of the chain may be secured to an upright rod 17, shown in Figs. 1 and 2. At the upper end of the rod 17 is a chain 18.

Mounted on the top of the cars such as box, refrigerator, stock, poultry, or on end sills or end platforms of these cars, or at suitable points on coal, dump or passenger cars, are spaced parallel upright members 19 and 20 having at their lower ends flanges 21 and 22 designed to be secured to the roof of the car for holding the members 19 and 20 in parallel upright position. The upper ends of the members 19 and 20 are braced by a transverse member 20ª.

The members 19 and 20 are provided with parallel vertical slots 23 extending through them. The slots 23 have a plurality of off sets or extensions 24, which extend downwardly and away from the slots 23, as illustrated in Fig. 3. Slidably extended between the members 19 and 20 is a lever member 25 having a longitudinal slot 26 through which is extended a pin or bolt 27 having on one end a head 29 outside the member 20, and on the other end a nut 30 outside the member 19. The bolt 27 is of such size as to travel properly in the slot 23 and to be received in the extension 24. On what may be called the forward end of the lever member 25 which projects beyond the end of the car is a hook member 31 in which one of the links of the chain 18 is received.

The lever member 25 may be formed with a handle 32 which may be pivoted to the lever portion 25 at 33ª, as shown in Fig. 3, to permit the handle 32 to be folded over to the position shown by dotted lines in Fig. 3 when not in use. The hinged joint is such as to prevent movement of the handle 32 in one direction with relation to the member 25 to position in alinement therewith, as is clearly seen from the showing in Fig. 3.

The lever member 25 in most all instances will include handle marked 32 without a hinge joint 33ª. Hinged joint mechanism is shown here as it may be necessary to be applied to cars of unusual height. The lever handle 32 is provided with a laterally projecting sharp edged member 33, designed to coact with notches 34 in an upright member 35 suitably mounted on the top of the car, whereby the handle 32 may be locked against upward movement. Near the lower part of the end of the car adjacent to the rod 17 and chain 15 is a projecting bracket 36 on which is pivoted a lever 37, one end of which is secured to the chain 15. Mounted on the end of the car is a notched bar 38 arranged to coact with a handle of the lever 37. By means of the construction just described, the brake may be set from the bottom of the car, which can not be performed with the brakes now ordinarily in use.

In the use of my improved brake controlling mechanism, assuming that the brakes are not set, the operator can set the brakes when standing in the stirrup 39 at the lower side of the car, and without climbing to the top of the car, or if the operator is on top of the car he can quickly and easily set the brakes by means of the lever handle 32. By means of the slot 26, the leverage, of which the operator may take advantage, may be varied considerably. The object of the slot 26 and the arrangement of the slots 23 and extensions 24 of my improved mechanism, is to enable the operator to shift the bolt 27 from one extension 24 to another extension 24, as may be necessary to regulate slack in chains, and to be readily and easily adjustable for use with cars of different kinds and sizes without any special changes in the parts or their arrangement, except such as is necessary to shift the position of the bolt 27.

With ordinary hand brakes now in use by which a chain is wound on the shaft by the rotation of a wheel, the brakes can be set to only a certain leverage. With a brake mechanism as herein described, much greater leverage can be secured, and the setting of the brakes is easier, quicker, and would be made much tighter. Where the ordinary brakes employing the hand-wheel on top of the car are used, there is danger that if the chain should break while the brakeman is setting the brake, or if the pawl commonly used should not catch, the brakeman may be jerked off the car, or thrown to the ground, or thrown between two cars. This danger is eliminated by my brake mechanism for the reason that if the chain should break while the brakeman is setting the brake by means of the upper lever, the operator would simply drop to the top of the car, and would not be thrown off, and if the chain should break while the operator is working the lever from the stirrup of the car, there is no danger of being thrown between the cars, or on the ground, for the reason that he is firmly holding one of the grab irons.

It will be understood that some changes may be made in the construction and arrangement of my improved brake without departing from its essential features and purposes, and it is my intention to cover by this application any such changes which may be included within the scope of my claims.

I claim as my invention:

1. In a brake mechanism for cars, the combination of a car with a chain, a guide pulley therefor at the lower end of the car, a fulcrum suitably attached to car, a lever designed to operate on said fulcrum, means for operatively connecting said lever with said chain, said lever having a slot through which the fulcrum extends.

2. In a brake mechanism for cars a chain, a guide pulley therefor at the lower part of one end of the car, a pair of upright members designed to be mounted on the upper end of a car, in parallel position, said upright members having parallel vertical slots with parallel downwardly inclined extensions, a lever mounted between said upright members, a bolt extended through said lever, means for operatively connecting said lever with said chain, said lever having a slot through which said bolt is extended.

3. In a brake mechanism for cars a chain, a guide pulley therefor at the lower part of the end of the car, a pair of upright members designed to be mounted on the upper end of a car, in parallel position, said upright members having parallel vertical slots with parallel downwardly inclined extensions, a lever mounted between said upright members, a bolt extended through said lever, means for operatively connecting said lever with said chain, said lever having a slot through which said bolt is extended, and having a jointed handle.

4. In a brake mechanism, a guide pulley adapted to be mounted on a car near the lower portion thereof at the end of car, a chain extended over said guide pulley, a lever designed to be mounted on the top of the car whereby said chain may be operated from top of car and a lever mounted on the end of the car operatively connected with said chain whereby said chain may be operated from the stirrup in both cases operating the brakes, one of said levers having a slot through which its fulcrum extends.

Des Moines, Iowa, October 30, 1915.

WILLIAM M. SHOLLEY.

Copies of this patent may be obtained for five cents each, by addressing the "Commissioner of Patents, Washington, D. C."